(12) United States Patent
Colgrove

(10) Patent No.: US 11,583,897 B2
(45) Date of Patent: *Feb. 21, 2023

(54) TENSION SCREENED ASSEMBLY

(71) Applicant: Derrick Corporation, Buffalo, NY (US)

(72) Inventor: James R. Colgrove, East Aurora, NY (US)

(73) Assignee: DERRICK CORPORATION, Buffalo, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 17/025,743

(22) Filed: Sep. 18, 2020

(65) Prior Publication Data
US 2021/0086232 A1 Mar. 25, 2021

Related U.S. Application Data

(60) Provisional application No. 62/902,688, filed on Sep. 19, 2019.

(51) Int. Cl.
*B07B 1/46* (2006.01)
*B07B 1/40* (2006.01)

(52) U.S. Cl.
CPC .......... *B07B 1/4618* (2013.01); *B07B 1/4681* (2013.01); *B07B 1/40* (2013.01)

(58) Field of Classification Search
CPC ........ B07B 1/40; B07B 1/4681; B07B 1/4618
USPC ....................................................... 209/392
See application file for complete search history.

(56) References Cited

U.S. PATENT DOCUMENTS

| 3,970,550 | A | * | 7/1976 | Fry ....................... B07B 1/4645 |
| | | | | 209/399 |
| 6,736,271 | B1 | | 5/2004 | Hall |
| 9,375,756 | B2 | * | 6/2016 | Lipa ...................... B07B 1/4681 |
| 9,403,192 | B2 | * | 8/2016 | Lipa ...................... B07B 1/4618 |
| 2007/0108107 | A1 | | 5/2007 | Morrow |

(Continued)

FOREIGN PATENT DOCUMENTS

| CN | 102470398 B | * | 12/2014 | ............... B07B 1/28 |
| WO | WO-9900198 A1 | * | 1/1999 | ........... B07B 1/4618 |

(Continued)

*Primary Examiner* — Terrell H Matthews
(74) *Attorney, Agent, or Firm* — FisherBroyles, LLP; Jason P. Mueller

(57) ABSTRACT

A disclosed screen assembly includes a frame and a tensioned molded polyurethane screen attached to the frame. The frame has a perimeter that is a circle, square, rectangle, triangle, pentagon, hexagon, or other multi-sided polygon, and the screen may have similarly shaped apertures. The frame includes a support grid structure bounded by the perimeter and the screen may either be attached only to the perimeter of the frame, or may be attached to the perimeter of the frame and to one or more locations of the support grid structure. The screen may include uniaxial or biaxial reinforcement members that are integrally molded with the screen, and the tensioned screen may include tension along a direction that is parallel to, or perpendicular to, a direction of the reinforcement members. A disclosed method includes applying tension to a molded polyurethane screen and attaching the tensioned molded polyurethane screen to the frame.

20 Claims, 15 Drawing Sheets

(56) References Cited

U.S. PATENT DOCUMENTS

| | | | |
|---|---|---|---|
| 2008/0078703 A1* | 4/2008 | Robertson | B07B 1/4627 |
| | | | 209/397 |
| 2008/0245707 A1 | 10/2008 | Smith | |
| 2010/0307962 A1* | 12/2010 | Robertson | B07B 1/4672 |
| | | | 209/408 |
| 2015/0239014 A1* | 8/2015 | Lipa | B07B 1/4618 |
| | | | 209/392 |
| 2019/0351454 A1* | 11/2019 | Malmberg | B07B 1/4663 |
| 2020/0246833 A1* | 8/2020 | Wojciechowski | B29C 65/1635 |

FOREIGN PATENT DOCUMENTS

| | | |
|---|---|---|
| WO | 2008038014 A2 | 4/2008 |
| WO | 2016148993 A1 | 9/2016 |

\* cited by examiner

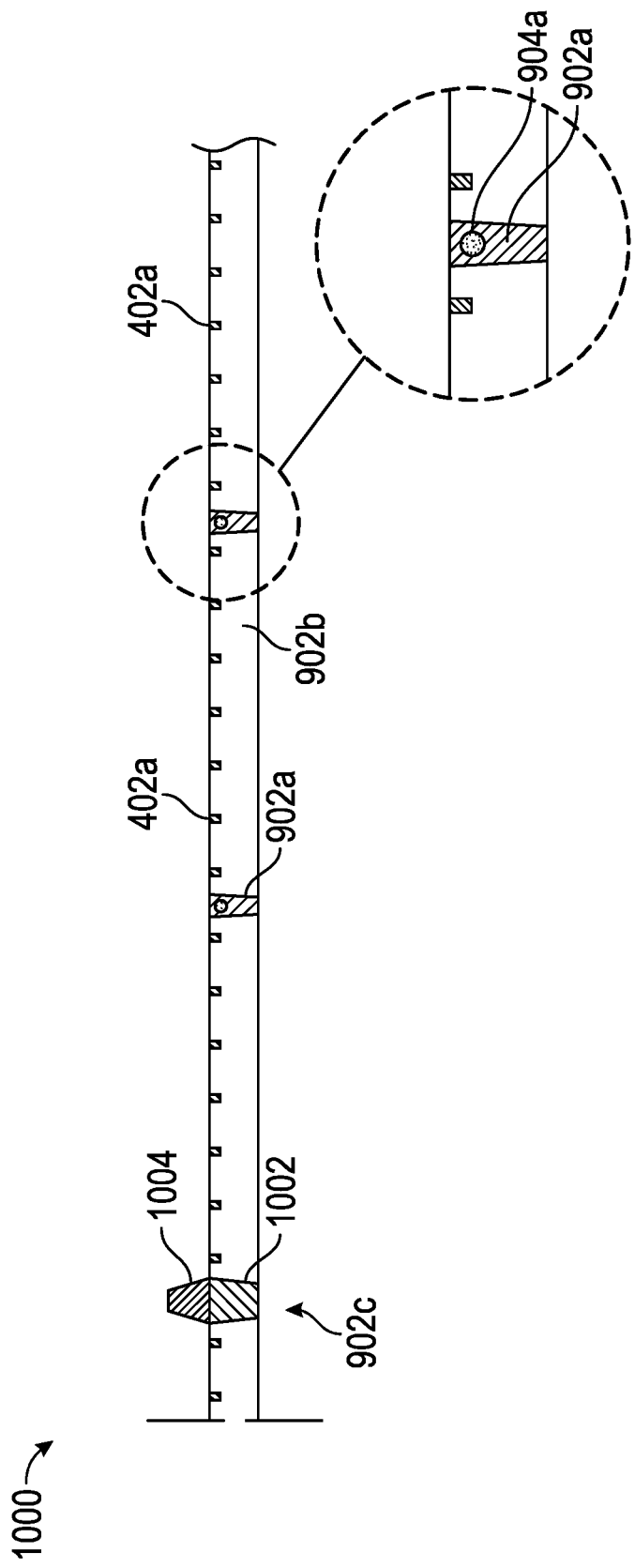

TENSION SCREENED ASSEMBLY

CROSS REFERENCE TO RELATED APPLICATION

This application claims priority to U.S. Provisional Patent Application No. 62/902,688; filed on Sep. 19, 2019, the disclosure of which is expressly incorporated herein by reference.

BRIEF DESCRIPTION OF THE DRAWINGS

The accompanying drawings form a part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein.

FIG. 10A illustrates an edge view of the molded polyurethane screen of FIGS. 9A and 9B, according to an embodiment.

FIG. 10B illustrates an enlarged edge view of the molded polyurethane screen of FIG. 10A, according to an embodiment.

DETAILED DESCRIPTION

Figure 1:
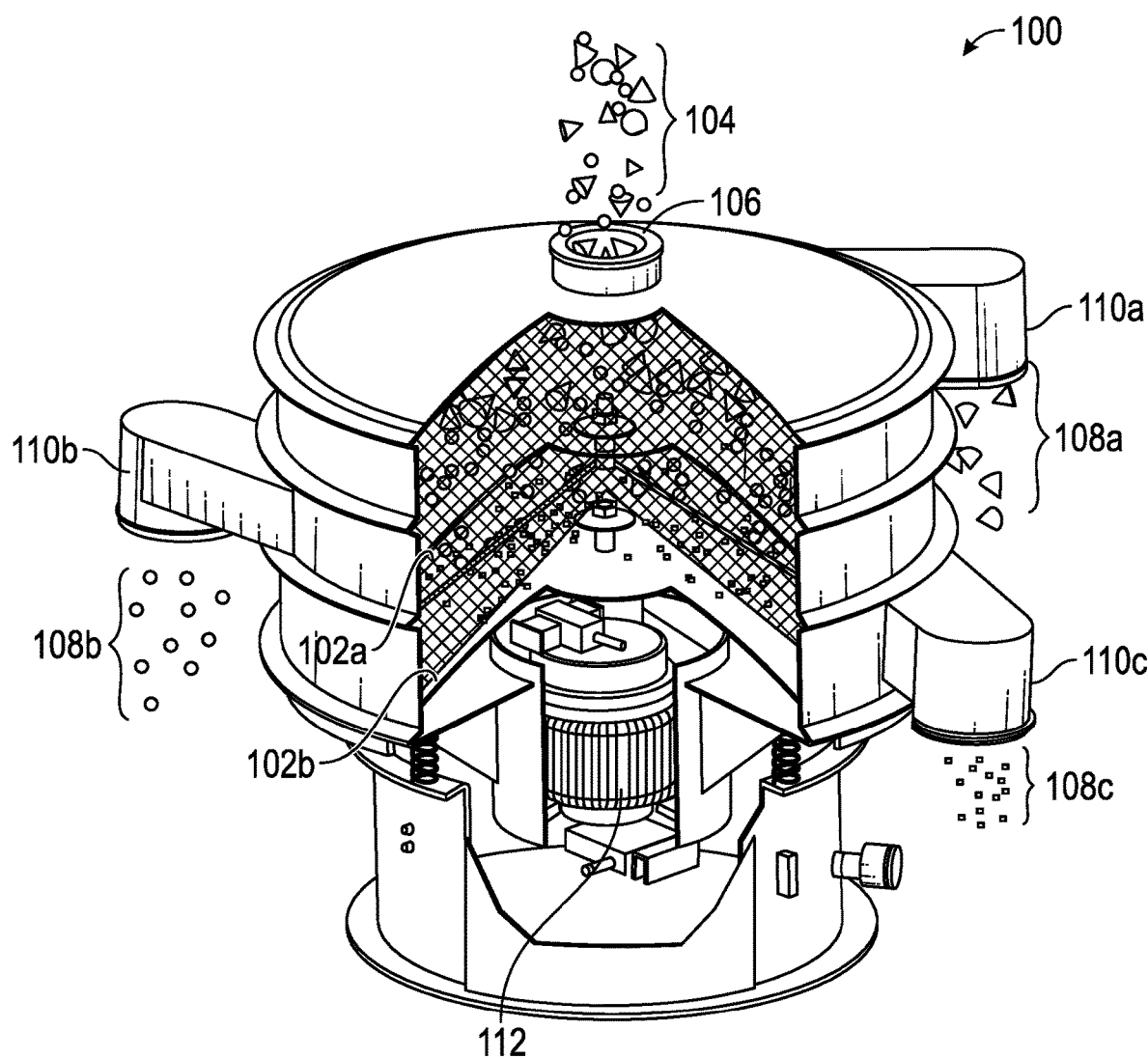
FIG. 1 illustrates an example attrition screening machine, according to an embodiment.

This disclosure generally relates to material screening systems and methods. For example, disclosed embodiments relate to screening members, screening assemblies, methods for fabricating screening members and assemblies, and methods of screening materials. Material screening includes the use of vibratory screening machines, which provide a capability to excite an installed screen such that materials placed upon the screen may be separated to a desired level. Oversized materials are separated from undersized materials. Over time, screens wear and require replacement. As such, screens are designed to be replaceable.

Disclosed embodiments provide improved screens and screen assemblies that may be used in screening machines such as those described in U.S. Pat. Nos. 8,584,866; 9,010,539; 9,375,756; and 9,403,192; the disclosure of each of which is expressly incorporated herein by reference. These screening machines, referred to as attrition screening devices, including for example, sifters, gyratory sifters, or graters, include a class of vibratory devices used to separate sized particles, as well as to separate solids from liquids. Sifters are used to screen, for example, minerals, feed material, plastic resins, and powders during industrial sorting and/or manufacturing operations.

Because sifters may be in continuous use, repair operations and associated downtimes need to be minimized as much as possible. Conventional sifters include screening assemblies that have a plate or frame as a base and a wire mesh, cloth, or other perforated filter overlay positioned as a screen over the plate or frame. These filter screens often wear out over time due to the particulate motion in the sifters, and subsequently require replacement. Conventional screens used in these sifters often wear out in three weeks or less. Also, woven wire cloth screens are problematic in that they can have inconsistent openings, sizes, or other irregularities due to inaccuracies in the weaving process.

Disclosed embodiments provide screens and screen assemblies to be used in these sifting screening machines that are safer, longer lasting, more easily removable and replaceable, lighter, and provide more consistent and accurate opening sizes than existing screens. Disclosed embodiments include reinforced molded polyurethane screens that may be tensioned over a frame of any desired shape to generate screen assemblies having corresponding desired shapes. For example, a screen assembly may have a perimeter that is a circle, square, rectangle, triangle, pentagon, hexagon, or other multi-sided polygon. In other embodiments, the perimeter need not have any specific symmetry and may be an asymmetric smooth or piecewise-smooth curve. In this regard, a frame of any shape (e.g., circular, triangular, square, rectangular, pentagonal, hexagonal, etc.) may be used as a substrate on which a molded polyurethane screen may be attached. Screens may be placed under tension when attaching such screens to a frame. Screens may be reinforced along one or two dimensions and may be placed under uniaxial or biaxial tension.

FIG. 1 illustrates an example attrition screening machine 100, according to an embodiment. Attrition screening machine 100 may be used to separate dry materials of various sizes. In this example, attrition screening machine 100 includes two circular screens 102a and 102b. A first material 104 may be introduced into attrition screening machine 100 through an inlet 106 of attrition screening machine 100. First material 104 may be separated by first screen 102a into a first oversized component and a first undersized component. The first oversized component that does not fall through first screen 102a may be removed from attrition screening machine 100 as a first separated material 108a through a first outlet 110a of attrition screening machine 100. The first undersized component that falls through first screen 102a may be further separated into a second oversized component and a second undersized component.

The second oversized component that does not fall through screen 102b may be removed from attrition screening machine 100 as a second separated material 108b through a second outlet 110b. Lastly, the second undersized component that falls through second screen 102b may be removed from attrition screening machine 100 as a third separated material 108c through a third outlet 110c of attrition screening machine 100. Separation of first material 104 in to first 108a, second 108b, and third 108c separated materials may be assisted by vibrations of screens 102a and 102b that may be provided by a vibratory motor 112. Other embodiment attrition screening machines may include greater or fewer screens to respectively separate greater or fewer components of an input material. Also, further embodiment attrition screening machines may take various other shapes.

Figure 2:
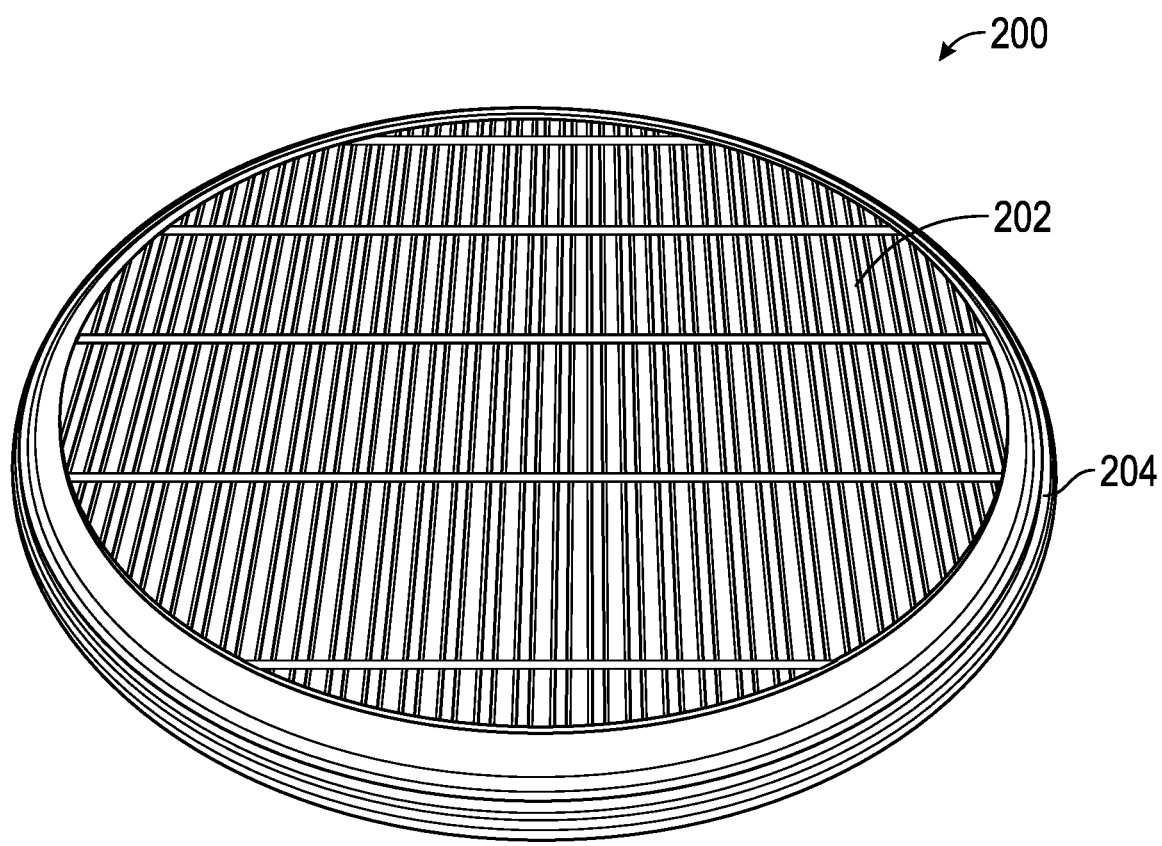
FIG. 2 illustrates a top perspective view of a circular screen assembly, according to an embodiment.

FIG. 2 illustrates a top perspective view of a circular screen assembly 200, according to an embodiment. Screen assembly 200 includes a molded polyurethane screen 202 attached to a circular frame 204. Polyurethane screen 202 may be reinforced as described, for example, in U.S. Pat. Nos. 9,010,539; 9,375,756; and 9,403,192 (cited above). Alternatively, screen 202 may be provided without reinforcements. Screen 202 may be placed under uniaxial or biaxial tension before attaching screen 202 to frame 204, as described in greater detail below. Screen 202 may be attached to frame 204 using various attachment methods. For example, screen 202 may be bonded to frame 204 using various adhesives or may be attached to frame 204 using clamps or various fasteners.

Frame 204 may be constructed of metal, plastic, nylon, etc., or any suitable structural material. For example, frame 204 may be an injection molded nylon structure. In further embodiments, frame 204 may be constructed as a plurality of separate pieces (not shown) that may be assembled into a final shape. For example, a circular frame such as frame 204 may include various circular arc segments (not shown) and may be configured to be snapped together to form frame 204.

Figure 3:
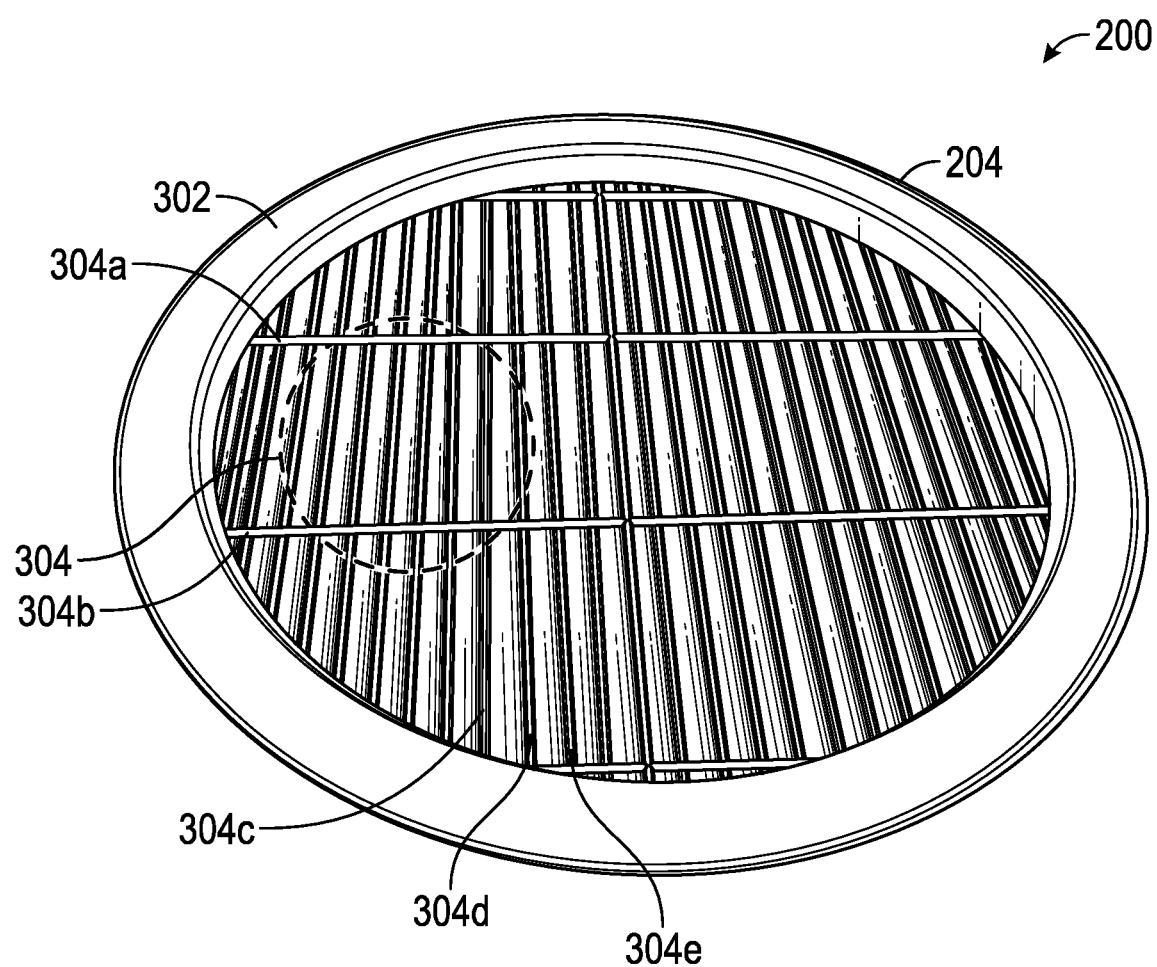
FIG. 3 illustrates a bottom perspective view of the circular screen assembly of FIG. 2, according to an embodiment.

FIG. 3 illustrates a bottom perspective view of the circular screen assembly 200 of FIG. 2, according to an embodiment. In this example, frame 204 includes a circular outer support region 302 that supports a plurality of support structures forming a support framework 304. In this view, support framework 304 includes horizontal support structures 304a and 304b, as well as a plurality of vertical support structures 304c, 304d, 304e, etc. Screen 202 (e.g., see FIG. 2) may be attached to frame 204 at various locations. For example, screen 202 may be attached to circular outer support region 302 as well as to support framework 304. Such attachment of screen 202 to both outer support region 302 as well as to support framework 304 leads to a secure attachment in which screen 202 is configured to closely follow movement of frame 204 during vibrational excitation of screen assembly 200 on a vibrational screening machine.

In other embodiments, screen 202 may be more loosely bound to frame 204. For example, screen 202 may be bonded only to circular outer support region 302. Such configuration would allow motion of screen 202 relative to support framework 304 during vibrational excitation of screen assembly 200 on a vibrational screening machine. Such relative motion may be advantageous for certain applications. For example, in a dry screening or sifting application (i.e., attrition screening) a $2^{nd}$ order movement or vibration of screen 202 relative to support framework 304 may aid in de-blinding of the screen (i.e., removing particles that may in certain situations become stuck in screen openings).

Figure 4A:
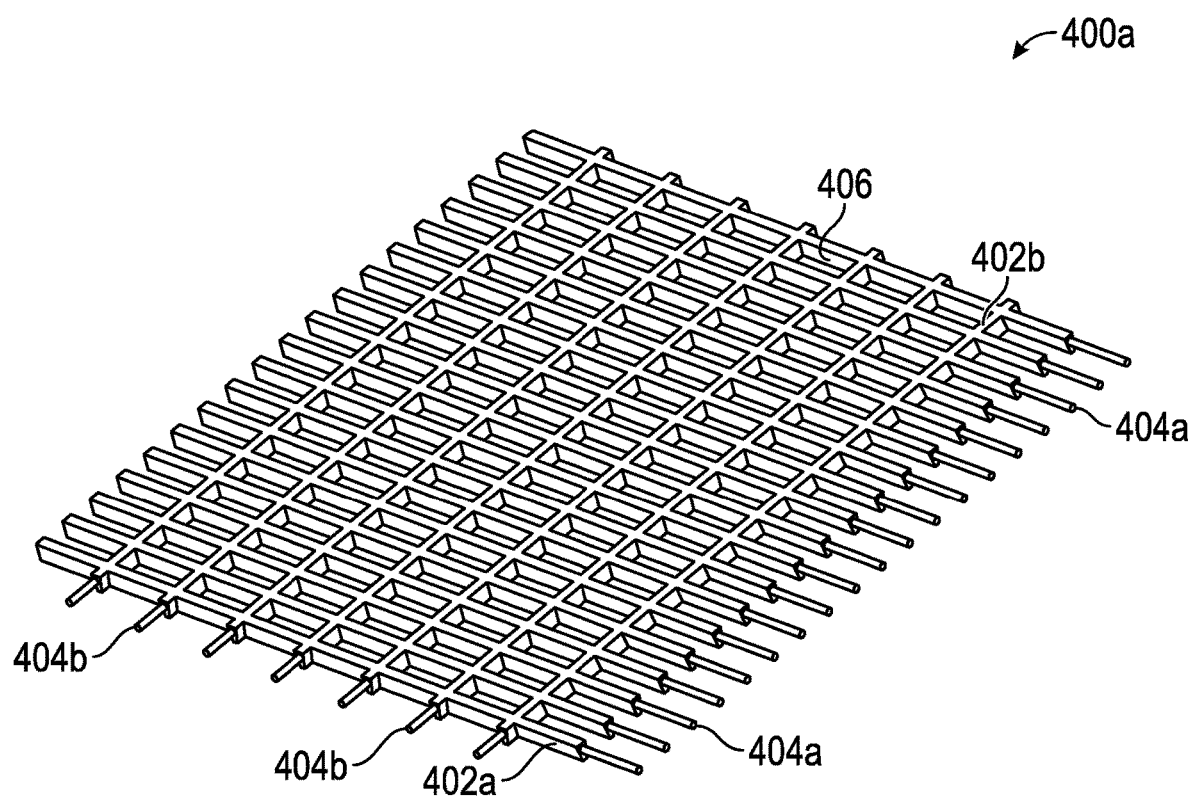
FIG. 4A illustrates a reinforced molded polyurethane screen having reinforcements along two directions, according to an embodiment.

FIG. 4A illustrates a reinforced molded polyurethane screen 400a having reinforcements along two directions, according to an embodiment. Screen 400a is similar to reinforced molded polyurethane screens described, for example, in U.S. Pat. Nos. 9,010,539; 9,375,756; and 9,403,192 (cited above). As shown in FIG. 4A, screen 400a has first and second members 402a and 402b with bi-directional reinforcement members 404a and 404b molded integrally therewith. In this regard, first members 402a include reinforcement members 404a molded integrally therewith. In this example, first reinforcement members 404a may have a thickness in a range of about 0.006 inches to about 0.015 inches. Second members 402b may include reinforcement members 404b molded integrally therewith. In this example, reinforcement members 404b may have a thickness in the range of about 0.015 inches to about 0.040 inches. Screen 404a includes apertures 406 formed as spaces between the plurality of first 402a and second 402b members. In further embodiments, screens may have other dimensions for similar features.

Figure 4B:
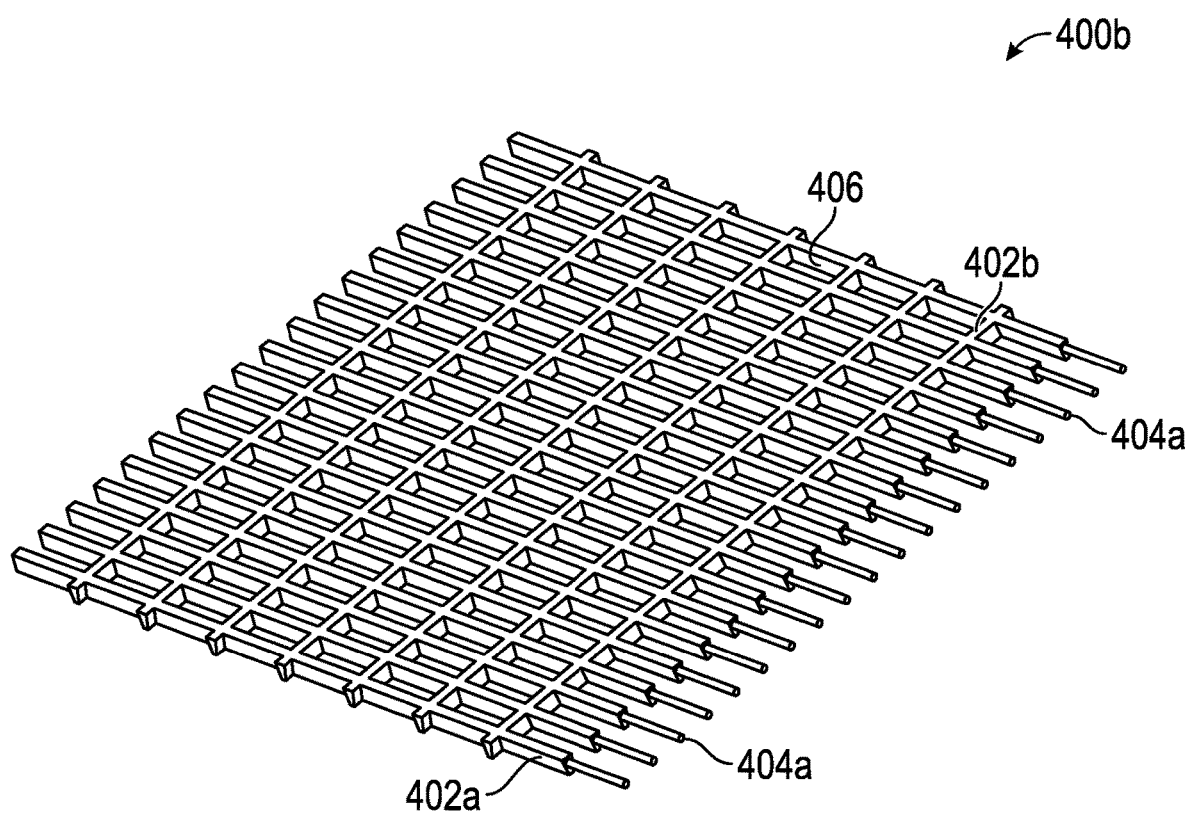
FIG. 4B illustrates a reinforced molded polyurethane screen having reinforcements along a single first direction, according to an embodiment.
Figure 4C:
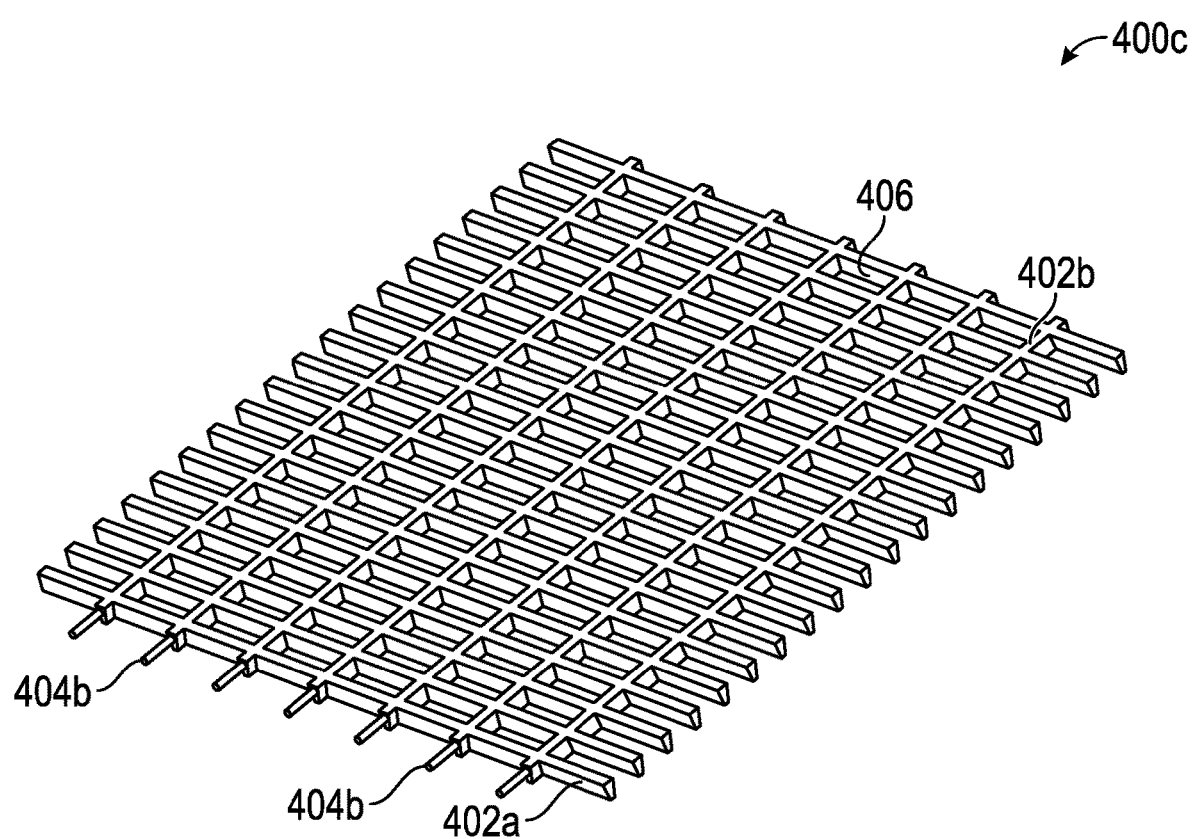
FIG. 4C illustrates a reinforced molded polyurethane screen having reinforcements along a single second direction, according to an embodiment.

FIGS. 4B and 4C illustrate respective reinforced molded polyurethane screens 400b and 400c, each having reinforcements along only a single direction, according to embodiments. Screens 400b and 400c are similar to screen 400a of FIG. 4A. In this regard, each of screens 400b and 400c include first and second members 402a and 402b forming a rectangular screening surface having apertures 406. However, screen 400b only has reinforcement members 404a that reinforce first members 402a, while second members 402b are not reinforced. In contrast, screen 400c only has reinforcement members 404b that reinforce second members 402b, while first members 402a are not reinforced.

As shown in FIGS. 4A to 4C, screen openings 406 are elongated with a greater length than width. In this example, screen openings 406 may be about 0.044 mm to about 4.0 mm in width (i.e., between the inner surfaces of adjacent first members 402a) and about 0.044 mm to about 60.0 mm in length (i.e., between inner surfaces of adjacent second members 402b). Screen openings 406 may have a variety of shapes. For example, the screen openings 406 may have a rectangular shape, a square shape, circular shape and/or any other shape that may be formed by the first and second members 402a, 402b.

Reinforcement members 404a and 404b as described herein may be an aramid fiber (or individual filaments thereof), a naturally occurring fiber, or other material having relatively large tensile strengths with relatively small cross-sectional areas. When an aramid fiber is used as reinforcements 404a and 404b, the fiber may include aramid fibers that are commercially obtainable under the trademark KEVLAR of the DuPont Company and further identified by the designation KEVLAR 29. In addition, the aramid fibers may be twisted or may be woven multi-strand fibers so that they act as wicks to absorb polyurethane material which is molded around the fibers to thereby provide a secure bond between fibers and polyurethane. Reinforcement members 404a and 404b may be tensioned before polyurethane is molded around them to thereby impart a compressive strain to reinforced screens 400a, 400b, and 400c.

Figure 5:
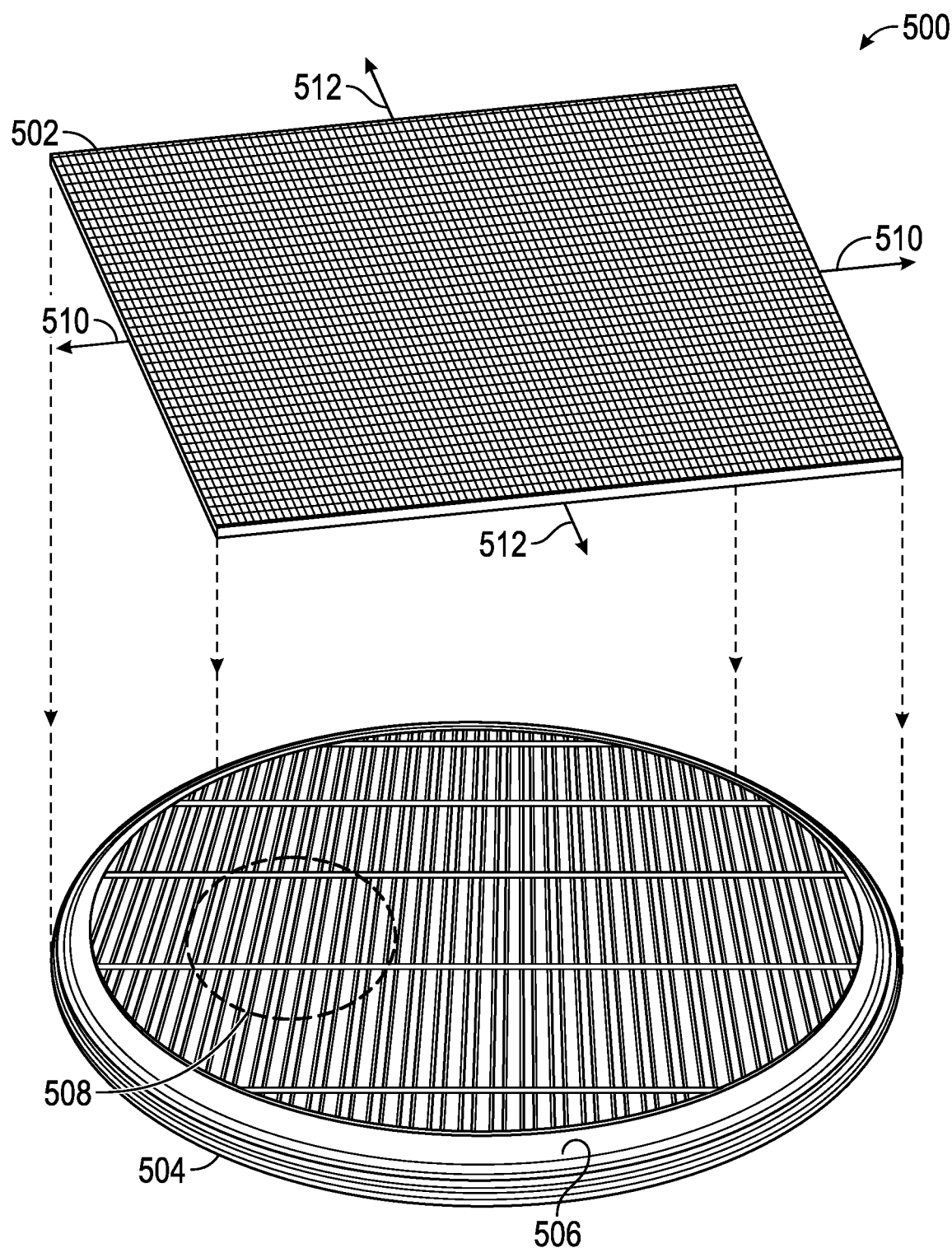
FIG. 5 illustrates a process of fabricating a circular screen assembly, according to an embodiment.

FIG. 5 illustrates a process of fabricating a circular screen assembly 500, according to an embodiment. In this example, a screen 502 and frame 504 are provided. Screen 502 may be a molded polyurethane screen such as screens 202, 400a, 400b, and 400c, described above with reference to FIGS. 2, 4A, 4B, and 4C, respectively. In this regard, screen 502 may be a reinforced or non-reinforced molded polyurethane screen. For reinforced embodiments, screen 502 may be biaxially reinforced (e.g., see FIG. 4A) or may be uniaxially reinforced (e.g., see FIGS. 4B and 4C). Frame 504 may be a circular frame similar to frame 204 described above with reference to FIGS. 2 and 3. In this regard, frame 504 may have an outer circular support region 506 and a support framework 508. In other embodiments, frame 504 may only include outer circular support region 506.

In a process of manufacturing circular screen assembly 500, screen 502 may be placed under uniaxial or biaxial tension before bonding screen 502 to frame 504. For example, screen 502 may be tensioned along a first direction 510 to generate a uniaxial tension. Alternatively, screen 502 may be tensioned along a second direction 512 without first placing screen 502 under tension along the first direction 510. In this regard, screen 502 may be placed under a first uniaxial tension along direction 510 or may be placed under a second uniaxial tension along direction 512. In a further embodiment, screen 502 may be tensioned along both directions 510 and 512 to generate a biaxial tension. Upon tensioning, screen 502 may then be attached to frame 504 using various attachment techniques. Once attached, edges of screen 502 may then be trimmed to yield the circular screen assembly of FIGS. 2 and 3. In certain embodiments, it may be advantageous to apply uniaxial tension to screen 502 in a direction perpendicular to a direction of reinforcement members (e.g., perpendicular to reinforcement members 404a in FIG. 4B, or perpendicular to reinforcement members 404b in FIG. 4C). In other embodiments, tension may be applied at other angles relative to reinforcing members. For example, tension may be applied along (i.e., parallel to) a direction of reinforcement members (e.g., along a direction of reinforcement members 404a in FIG. 4B, or along a direction of reinforcement members 404b in FIG. 4C).

Figure 6:
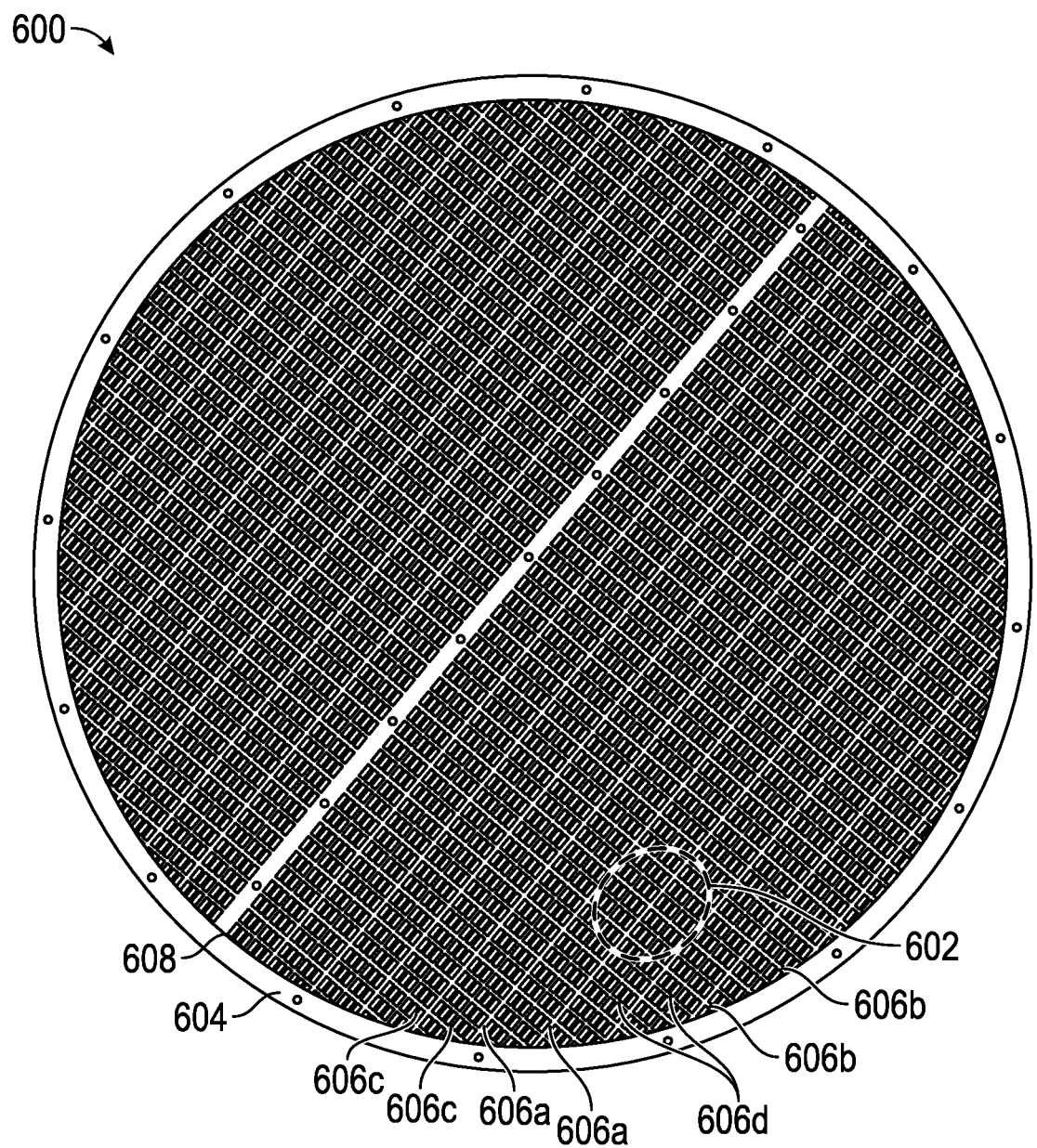
FIG. 6 illustrates a circular frame having a support grid structure, according to an embodiment.

FIG. 6 illustrates a circular frame 600 having a support grid structure 602, according to an embodiment. In this example, frame 600 has a circular outer frame 604 that provides support for grid structure 602. As shown, grid structure 602 may include a plurality of support members 606a along a first direction and a plurality of support members 606b along a second direction. Grid structure 602 may further include a third plurality of more-closely spaced support members 606c along the first direction and a fourth plurality of more-closely spaced support members 606d along the second direction. Grid structure 602 may further include a central support member 608.

A circular screening assembly may be generated from circular frame 600 using a process such as the one described above with reference to FIG. 5. For example, a reinforced or un-reinforced polyurethane screen (e.g., screens 202, 400a, 400b, 400c, and 502 of FIGS. 2, 4A, 4B, 4C, and 5, respectively) may be placed under tension and then attached to circular frame 600. As described above, such a screen (not shown) may be placed under uniaxial or biaxial tension. Further, for uniaxial reinforced screens (e.g., see FIGS. 4B and 4C), tension may be applied in a direction parallel to or perpendicular to a direction in which the screen is reinforced. In other embodiments, tension may be applied along a direction forming a pre-determined angle with respect to a direction of reinforcing members.

Figure 7:
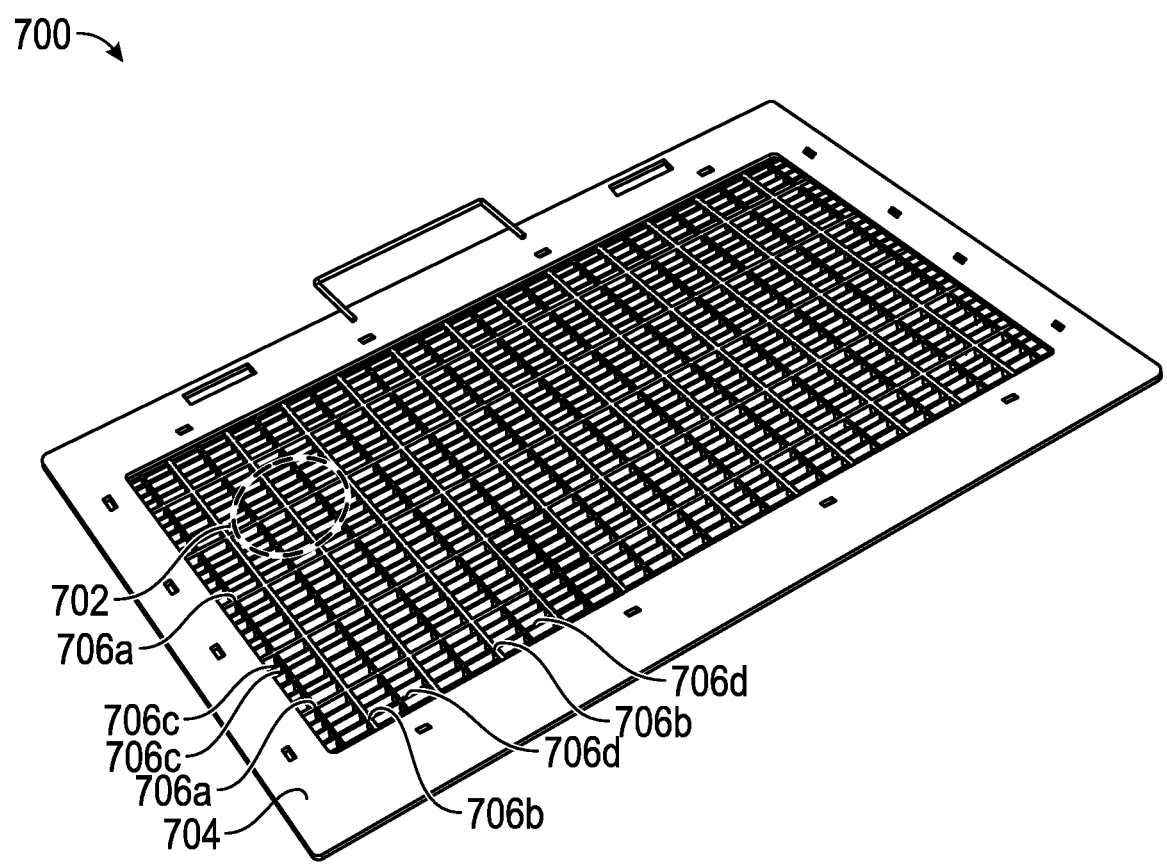
FIG. 7 illustrates a rectangular frame having a support grid structure, according to an embodiment.

FIG. 7 illustrates a rectangular frame 700 having a support grid structure 702, according to an embodiment. In this example, frame 700 has a rectangular outer frame 704 that provides support for grid structure 702. As shown, grid structure 702 may include a plurality of support members 706a along a first direction and a plurality of support members 706b along a second direction. Grid structure 702 may further include a third plurality of more-closely spaced support members 706c along the first direction and a fourth plurality of more-closely spaced support members 706d along the second direction.

A rectangular screening assembly may be generated from rectangular frame 700 using a process such as the one described above with reference to FIG. 5. For example, a reinforced or un-reinforced polyurethane screen (e.g., screens 202, 400a, 400b, 400c, and 502 of FIGS. 2, 4A, 4B, 4C, and 5, respectively) may be placed under tension and then attached to rectangular frame 700. As described above, such a screen (not shown) may be placed under uniaxial or biaxial tension. Further, for uniaxial reinforced screens (e.g., see FIGS. 4B and 4C), tension may be applied in a direction parallel to or perpendicular to a direction in which the screen is reinforced. In other embodiments, tension may be applied along a direction forming a pre-determined angle with respect to a direction of reinforcing members.

Figure 8:
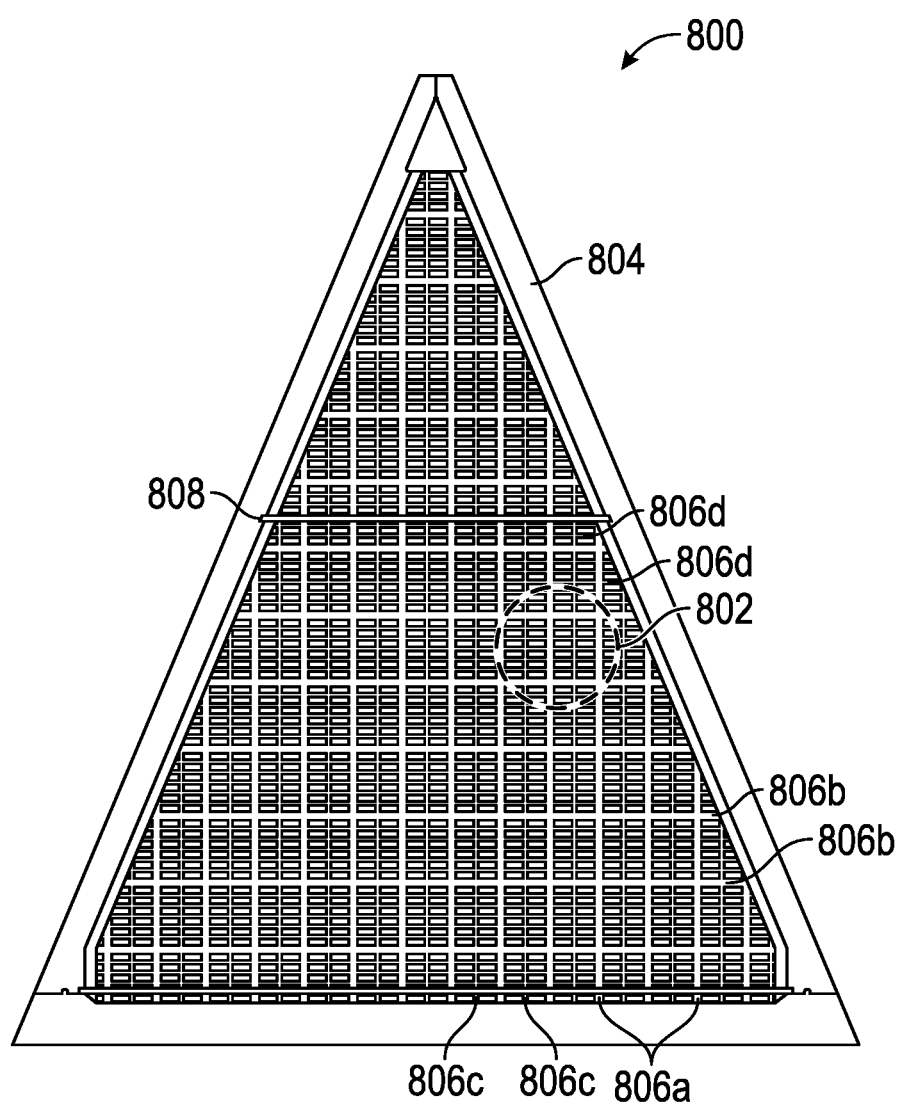
FIG. 8 illustrates a triangular frame having a support grid structure, according to an embodiment.

FIG. 8 illustrates a triangular frame 800 having a support grid structure 802, according to an embodiment. In this example, frame 800 has a triangular outer frame 804 that provides support for grid structure 802. As shown, grid structure 802 may include a plurality of support members 806a along a first direction and a plurality of support members 806b along a second direction. Grid structure 802 may further include a third plurality of more-closely spaced support members 806c along the first direction and a fourth plurality of more-closely spaced support members 806d along the second direction. Grid structure 802 may further include a central support member 808.

A triangular screening assembly may be generated from triangular frame 800 using a process such as the one described above with reference to FIG. 5. For example, a reinforced or un-reinforced polyurethane screen (e.g., screens 202, 400a, 400b, 400c, and 502 of FIGS. 2, 4A, 4B, 4C, and 5, respectively) may be placed under tension and then attached to triangular frame 800. As described above, such a screen (not shown) may be placed under uniaxial or biaxial tension. Further, for uniaxial reinforced screens (e.g., see FIGS. 4B and 4C), tension may be applied in a direction parallel to or perpendicular to a direction in which the screen is reinforced. In a further embodiment, a screen having triangular symmetry (not shown) may be manufactured. Such a triangular screen may be configured to support triaxial reinforcement, biaxial reinforcement, or uniaxial reinforcement. Similarly, such a triangular screen may support triaxial, biaxial, and uniaxial tensioning. In other embodiments, tension may be applied along a direction forming a pre-determined angle with respect to a direction of reinforcing members.

As described above, screens that may be tensioned over a frame of any desired shape to generate screen assemblies having corresponding desired shapes. For example, a screen assembly may have a perimeter that is a circle, square, rectangle, triangle, pentagon, hexagon, or other multi-sided polygon. In other embodiments, the perimeter need not have any specific symmetry and may be an asymmetric smooth or piecewise-smooth curve. In this regard, a frame of any shape (e.g., circular, triangular, square, rectangular, pentagonal, hexagonal, etc.) may be used as a substrate on which a molded polyurethane screen may be attached. Screens may be placed under tension when attaching such screens to a frame. Screens may be reinforced along one, two, three, etc., directions and may be placed under uniaxial, biaxial, triaxial, etc., tension. Frames may include a support grid or may include only an outer perimeter frame. The above examples have described screening assemblies based on polyurethane screens. However, in further embodiments various other materials may be used to generate screens, such as materials including thermoplastic polyurethane (TPU), other synthetic and natural rubber, etc. Further embodiments may include screening materials having additional reinforcement structures as described, for example, in U.S. Pat. Nos. 9,010,539; 9,375,756; and 9,403,192 (cited above).

Figures 9A, 9B:
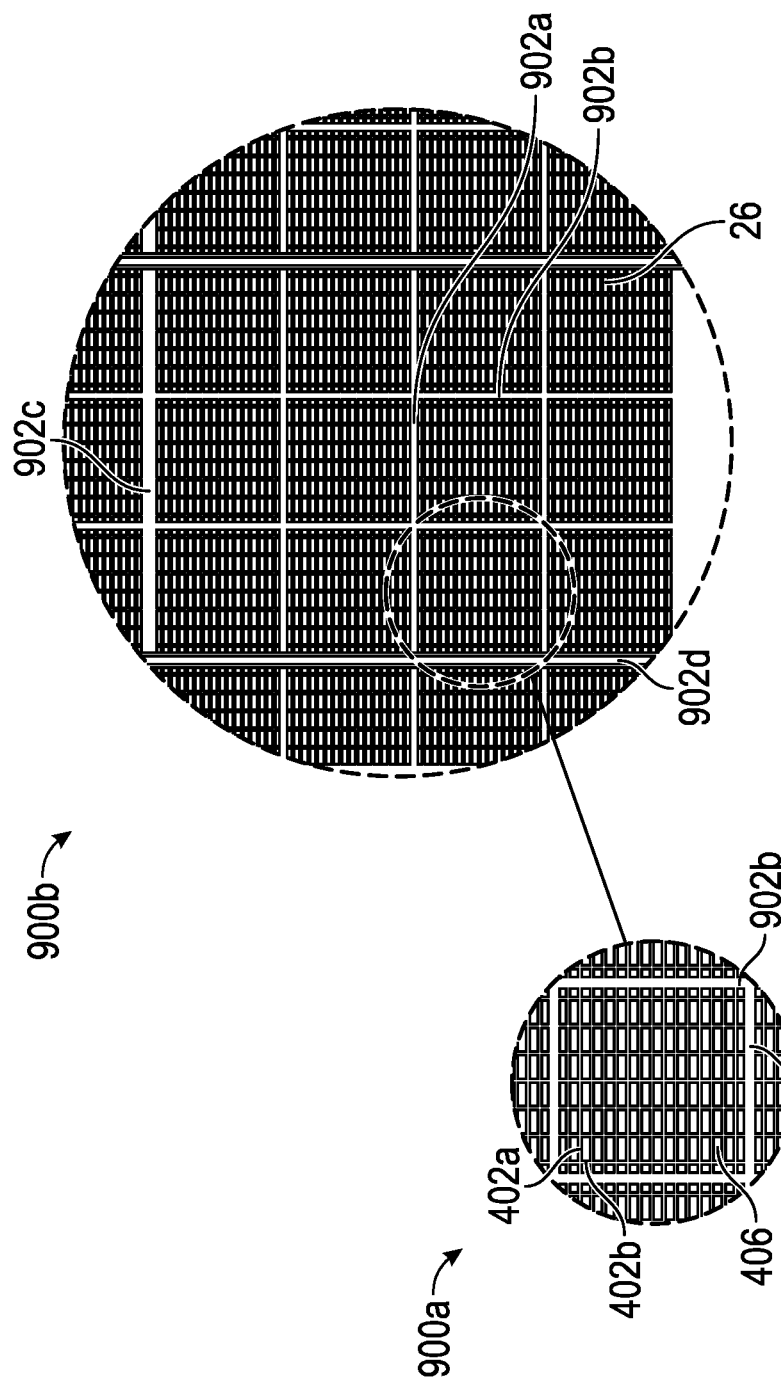
FIG. 9A illustrates a portion of a molded polyurethane screen having various support members, according to an embodiment.
FIG. 9B illustrates a larger portion of the molded polyurethane screen of FIG. 9A, according to an embodiment.

FIGS. 9A and 9B illustrate portions of a molded polyurethane screen having various support members, according to an embodiment. FIG. 9A, for example, shows a portion 900a of a molded polyurethane screen having detail similar to that described above with reference to FIG. 4A. In this regard, portion 900a includes first and second members 402a and 402b each having first and second thicknesses. Apertures 406 are formed by spaces between first and second members 402a and 402b. As described above with reference to FIGS. 4A to 4C, first and second members 402a and 402b may or may not be reinforced. For certain applications, it may be advantageous to have additional support members. In this regard, screen portion 900a may further include third and fourth members 902a and 902b. Third and fourth members 902a and 902b may be configured to have a larger thickness and larger spacing than first and second members 402a and 402b.

In further embodiments, the molded polyurethane screen may have additional support members as shown, for example, in FIG. 9B. In this regard, FIG. 9B shows a larger area of the screen that is shown in FIG. 9A. In the larger-area view of FIG. 9B third and fourth members 902a and 902b are shown. The view of FIG. 9B further illustrates fifth and sixth members 902c and 902d. Fifth and sixth members 902c and 902d may be configured to have larger thickness and larger spacing than first 402a, second 402b, third 902a, and fourth 902b members. As such, the presence of third 902a, fourth 902b, fifth 902c, and sixth 902d members provides additional mechanical support to the screen of FIGS. 9A and 9B than would be provided by first and second members 402a and 402b alone. This additional support allows smaller apertures to be more closely spaced, thereby increasing a screening area fraction, as described in greater detail, for example, in U.S. Pat. Nos. 9,010,539; 9,375,756; and 9,403,192 (cited above).

FIG. 10A illustrates an edge view 1000 of the molded polyurethane screen of FIGS. 9A and 9B; and FIG. 10B illustrates an enlarged edge view of the molded polyurethane screen of FIG. 10A, according to an embodiment. FIG. 10A illustrates a relative size and spacing of first members 402a, and a relative size and spacing of third members 902a. Further, as shown in the enlarged view of FIG. 10B, third members 902a may include reinforcement members 904a, similar to reinforcement members 404a and 404b described above with reference to FIGS. 4A to 4C.

As also shown in FIG. 10A, fifth members 902c may have a thickness greater than the third 902a and fourth 902b members and may have a portion 1002 extending downwardly away from the top surface of the screen. The greater thickness of portion 1002 extending downwardly may to provide additional structural support to first and second members 402a and 402b and third and fourth members 902a and 902b. Fifth members 902c may include a portion 1004 extending upwardly away from the screen. Portion 1004 may be substantially triangular in cross-section with apexes projecting away from the upper surface the screen. Portion 1004 extends upwardly away from the surface of the screen and may act as a flow guide.

Figure 11:
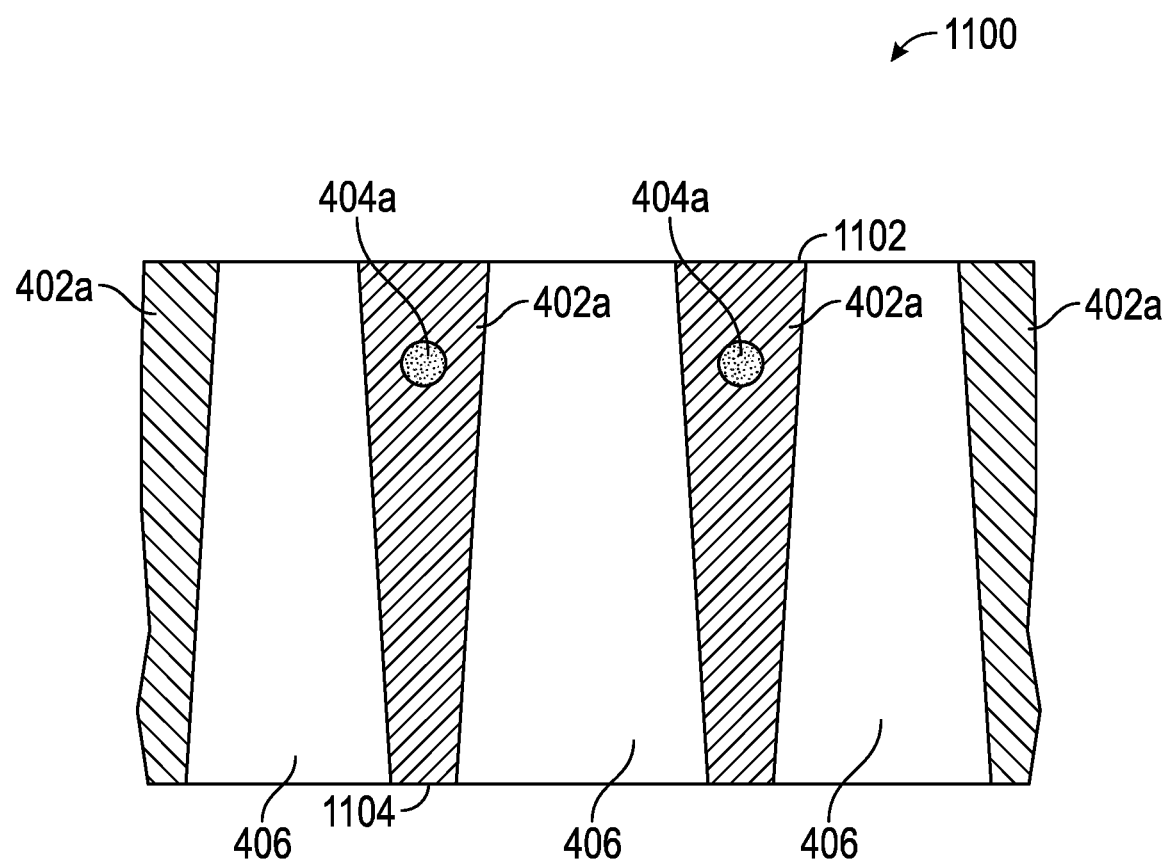
FIG. 11 illustrates a further enlarged edge view of the molded polyurethane screen of FIG. 10A, according to an embodiment.

FIG. 11 illustrates a further enlarged edge view 1100 of the molded polyurethane screen of FIG. 10A, according to an embodiment. This view shows details of adjacent first members 402a (e.g., see FIGS. 4A to 4C, 10A, and 10B). Screen openings 406 may diverge downwardly between an upper surface 1102 and a lower surface 1104 and each first member 402a may be substantially in a shape of an inverted trapezoid. This general shape of first members 402a may act to prevent screen blinding. As shown in FIG. 11, first members 402a may include reinforcement members 404a. In further embodiments, first members 402a may be provided without reinforcements (e.g., see FIG. 4C).

Figure 12:
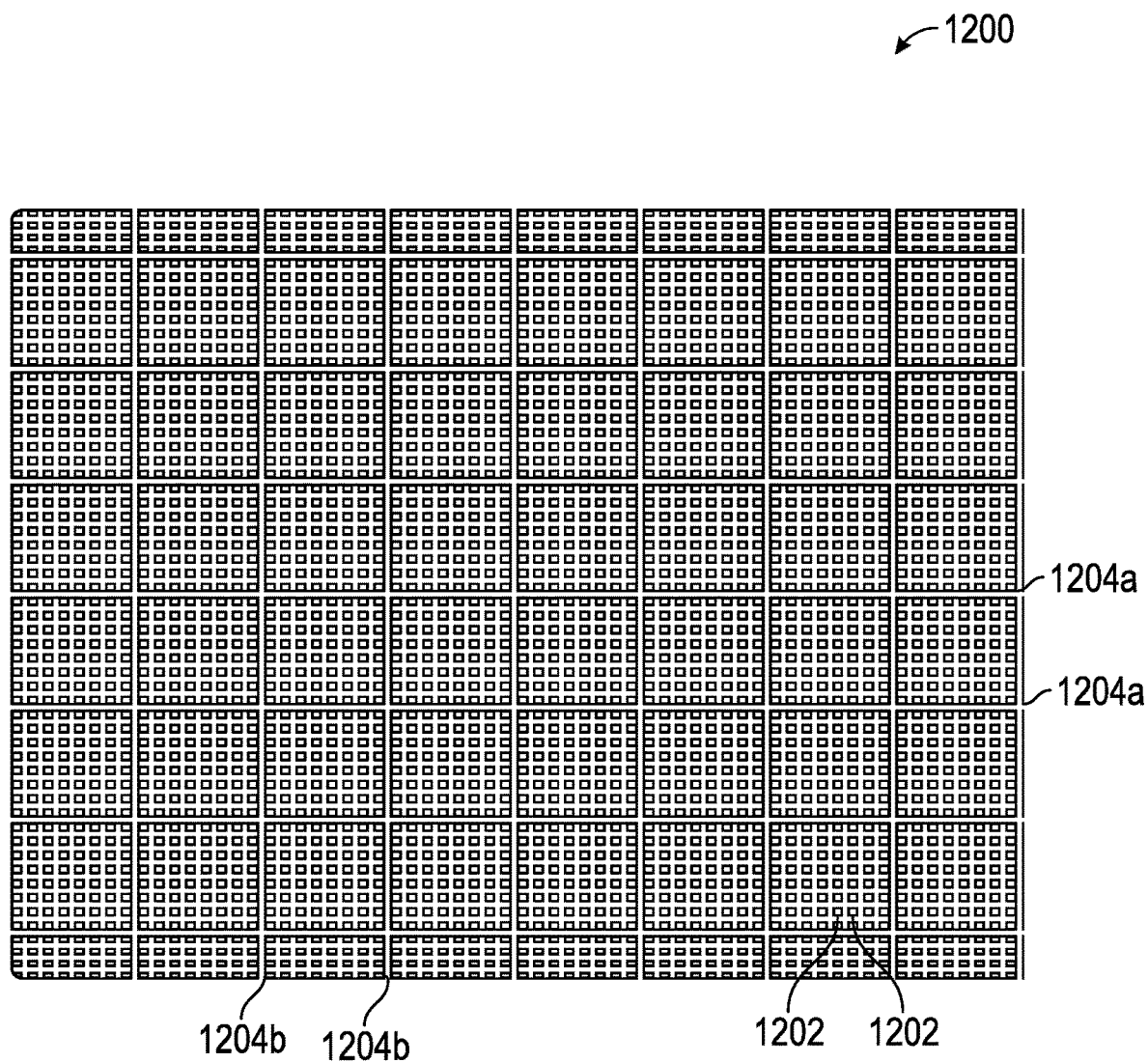
FIG. 12 illustrates a molded polyurethane screen having square apertures, according to an embodiment.

FIG. 12 illustrates a top view of molded polyurethane screen 1200 having square apertures 1202, according to an embodiment. As mentioned above, screens may have a variety of shapes and symmetries. Screens may have apertures having various shapes. For example, each aperture may be a circle, square, rectangle, triangle, pentagon, hexagon, or other multi-sided polygon. Screen 1200 is described in greater detail in U.S. Pat. No. 9,403,192 (cited above). Screen 1200 may have first members 1204a and second members 1204b. Further, first 1204a and second 1204b members may include reinforcement members (not shown), as described above with reference to FIGS. 4A to 4C, 10A, 10B, and 11.

As described above with reference to FIG. 5, a screen assembly may be generated from screen 1200 by first applying uniaxial or biaxial tension to screen 1200. Upon tensioning, screen 1200 may then be attached to a frame having a desired shape. For example, tensioned screen 1200 may be attached to circular frame (e.g., see FIGS. 2, 3, 5, and 6), to a rectangular frame (e.g., see FIG. 7), to a triangular frame (e.g., see FIG. 8) or to a frame having any desired shape. Further, tension may be applied in any direction relative to a direction of reinforcement members. For example, for a screen having reinforcement members along a first direction (e.g., along the direction of first members 1204a), uniaxial tension may be applied along a direction parallel or perpendicular to the first direction (i.e., tension applied parallel or perpendicular to the direction of first members 1204a). In further embodiments, it may be advantageous to apply uniaxial tension along a direction that is at a pre-determined angle (not shown) relative to a direction of reinforcement members. In other embodiments, biaxial tension may be applied to screen 1200 such that axes along which tension is applied are rotated by a pre-determined angle (not shown) relative to one or more axes defined by reinforcement members.

Figure 13:
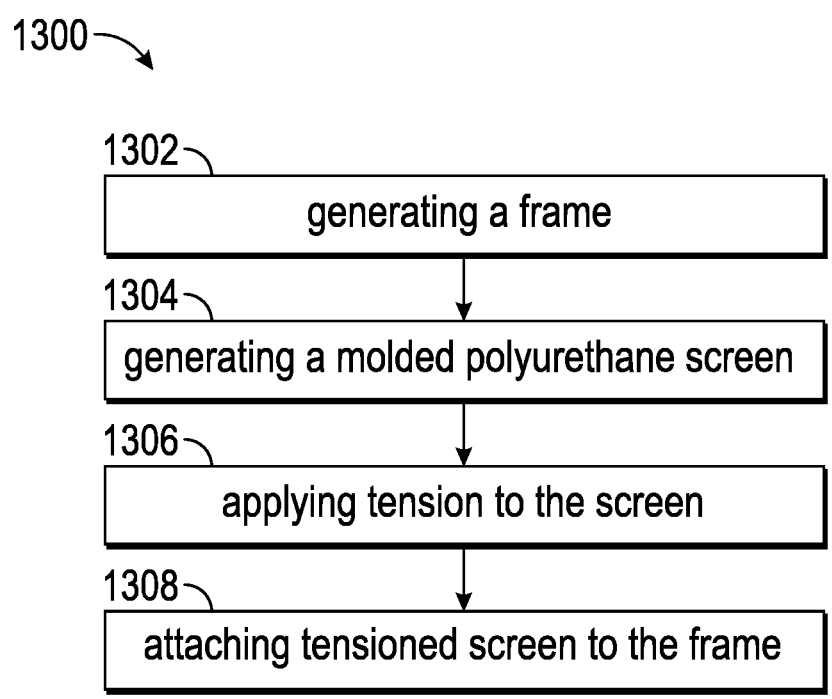
FIG. 13 is a flowchart illustrating a method of generating a screen assembly, according to an embodiment.

FIG. 13 is a flowchart illustrating a method 1300 of generating a screen assembly, according to an embodiment. In a first stage 1302, the method includes generating a frame. The frame may be constructed of metal, plastic, nylon, etc., or any suitable structural material. For example, the frame may be an injection molded nylon structure. In further embodiments, the frame may be constructed as a plurality of separate pieces that may be assembled into a final shape. For example, a circular frame may be constructed from separate circular arcs (not shown) that may then be snapped together to form the circular frame. In a second stage 1304, the method includes generating a molded polyurethane screen. The molded polyurethane screen may further be generated to include a plurality of reinforcement members. For example, aramid fibers may be integrally molded with screen elements. In other embodiments, reinforcement members may be rods made of metal, polymer, or any other suitable material.

In stage 1306, the method includes applying tension to the molded polyurethane screen. Tension may be applied as a uniaxial or biaxial tension and may be applied at an angle relative to a direction of reinforcement members. For example, uniaxial tension may be applied in a direction that is parallel to, or perpendicular to, the direction of uniaxial reinforcement members. In other embodiments, tension may be applied along a direction forming a pre-determined angle with respect to a direction of reinforcing members. In stage 1308, the method includes attaching the tensioned molded polyurethane screen to the frame. The screen may be attached to the frame using various techniques such as bonding using an adhesive, clamping, or using various fasteners.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

While embodiments of this disclosure are described with reference to various embodiments, it is noted that such embodiments are illustrative and that the scope of the disclosure is not limited to them. Those of ordinary skill in the art may recognize that many further combinations and permutations of the disclosed features are possible. As such, various modifications may be made to the disclosure without departing from the scope or spirit thereof. In addition, or in the alternative, other embodiments of the disclosure may be apparent from consideration of the specification and annexed drawings, and practice of the disclosure as presented herein. The examples put forward in the specification and annexed drawings are illustrative and not restrictive. Although specific terms are employed herein, they are used in a generic and descriptive sense only and not for purposes of limitation.

The invention claimed is:

1. A replaceable screen assembly for an attrition screening apparatus, comprising:
  a frame; and
  a pre-tensioned molded polyurethane screen secured to the frame,
  wherein the polyurethane screen has reinforcement members integrally molded therein,
  wherein the polyurethane screen has openings having a smallest length in a range from approximately 0.044 mm to approximately 4.0 mm, and
  wherein the screen assembly is configured to be removably attachable to an attrition screening apparatus.

2. The screen assembly of claim 1, wherein the reinforcement members provide unidirectional or bidirectional reinforcement.

3. The screen assembly of claim 1, wherein the screen includes apertures that each have a shape of a circle, square, rectangle, triangle, pentagon, hexagon, or other multi-sided polygon.

4. The screen assembly of claim 1, wherein the frame has a perimeter that is a circle, square, rectangle, triangle, pentagon, hexagon, or other multi-sided polygon.

5. The screen assembly of claim 1, wherein the frame has a perimeter that is an asymmetric smooth or piecewise-smooth closed curve.

6. The screen assembly of claim 4, wherein the screen is attached only to the perimeter of the frame.

7. The screen assembly of claim 4, wherein the frame includes a support grid structure bounded by the perimeter.

8. The screen assembly of claim 7, wherein the screen is attached to the perimeter of the frame and is attached to one or more locations of the support grid structure.

9. The screen assembly of claim 1, wherein the screen is tensioned with a uniaxial or a biaxial tension.

10. The screen assembly of claim 1, wherein the screen includes uniaxial reinforcement members.

11. The screen assembly of claim 10, wherein the screen is tensioned with a uniaxial tension along a direction is at a pre-determined angle relative to a direction of the reinforcement members.

12. The screen assembly of claim 11, wherein the screen is tensioned with a uniaxial tension along a direction that is parallel to, or perpendicular to, the direction of the uniaxial reinforcement members.

13. A method of generating a screen assembly, the method comprising:
  generating a frame;
  generating a molded polyurethane screen having reinforcement members integrally molded therein, the polyurethane screen having openings having a smallest length in a range from approximately 0.044 mm to approximately 4.0 mm;
  applying tension to the molded polyurethane screen; and
  securing the tensioned screen to the frame.

14. The method of claim 13, wherein generating the frame further comprises generating the frame to have a perimeter that is a circle, square, rectangle, triangle, pentagon, hexagon, or other multi-sided polygon.

15. The method of claim 13, wherein generating the molded polyurethane screen further comprises generating the molded polyurethane screen to include uniaxial reinforcement members that are integrally molded within the screen.

16. The method of claim 15, wherein applying tension to the molded polyurethane screen further comprises applying a uniaxial tension along a direction that is parallel to, or perpendicular to, a direction of the uniaxial reinforcement members.

17. The method of claim 14, wherein:
  generating the frame further comprises generating the frame to further include a support grid structure; and
  attaching the tensioned molded polyurethane screen to the frame further comprises:
    attaching the tensioned molded polyurethane screen only to the perimeter of the frame; or
    attaching the tensioned molded polyurethane screen to the perimeter of the frame and to one or more locations of the support grid structure.

18. A method of screening a material, the method comprising:
  installing a replaceable screen assembly on an attrition screening apparatus, the screen assembly having a frame and a pre-tensioned molded polyurethane screen secured to the frame;
  imparting vibrational motion to the screen assembly via the attrition screening apparatus;

introducing material onto the vibrating screen assembly; and screening the material with the vibrating screen assembly, wherein the polyurethane screen has reinforcement members integrally molded therein, and wherein the polyurethane screen has openings having a smallest length in a range from approximately 0.044 mm to approximately 4.0 mm.

19. The method of claim 18, wherein the screen assembly further comprises:

uniaxial reinforcement members that are integrally molded within the screen, wherein the tensioned molded polyurethane screen includes a uniaxial tension along a direction that is parallel to, or perpendicular to, a direction of the uniaxial reinforcement members.

20. The method of claim 18, wherein the frame has a perimeter that is a circle, square, rectangle, triangle, pentagon, hexagon, or other multi-sided polygon.

* * * * *